United States Patent [19]
Renaud et al.

[11] Patent Number: 4,713,541
[45] Date of Patent: Dec. 15, 1987

[54] OPTICAL POSITION LOCATING DEVICE

[75] Inventors: Jean-Marie Renaud, Courbevoie; Paul Gambs, Ecully; Jean-Claude Perrot, Montigny en Cormeilles; Jacques Taillebois, Plaisir, all of France

[73] Assignee: M.C.B., Courbevoie, France

[21] Appl. No.: 810,719

[22] Filed: Dec. 19, 1985

[30] Foreign Application Priority Data

Dec. 21, 1984 [FR] France ................. 84 19712

[51] Int. Cl.$^4$ ............................................. G01D 5/34
[52] U.S. Cl. .............................. 250/231 SE; 250/237 G
[58] Field of Search ................. 250/231 SE, 237 G; 356/395; 340/347 P

[56] References Cited

U.S. PATENT DOCUMENTS 3,502,414  3/1970  Kreckel et al. .................. 356/152
4,291,976  9/1981  McMahon ..................... 250/231 SE

FOREIGN PATENT DOCUMENTS 0107374  9/1983  European Pat. Off. .
2071896  3/1981  United Kingdom .

OTHER PUBLICATIONS

Patent Abstracts Of Japan, vol. 5, No. 182 (P-90) [854] 20 Nov. 1981; & JP-A-56 111 415.
Patent Abstracts Of Japan, vol. 5, No. 182 (P-90) [854] 20 Nov. 1981; & JP-A-56 111 416.

Primary Examiner—David C. Nelms
Attorney, Agent, or Firm—Antonelli, Terry & Wands

[57] ABSTRACT

An optical position locating device is provided comprising a light emitter, a bidirectional optical coupler, an optical fiber, a series of micromirrors disposed between a fiber and disk carrying the coded tracks (one mirror opposite each track). A control unit successively brings one and only one mirror into an active position, the others remain in a rest position. An optoelectronic reader emitting a light pulse in response to the light reflected by one of the mirrors in the active position through the optical fiber and and a processing unit processes these signals.

11 Claims, 4 Drawing Figures

OPTICAL POSITION LOCATING DEVICE

BACKGROUND OF THE INVENTION

The present invention relates to optical devices for locating by diascopy the position of a mobile element.

It is known that such a device comprises, a disk or strip comprising several tracks, each with a succession of fine alternating opaque (reflecting) and transparent zones and a reading assembly comprising, a light source and one or more photodetectors which detect for each track if it is an opaque zone (reflecting) or a transparent zone which is present in front of the photodetector(s). The disk or the strip and the reading assembly are mobile with respect to each other either in rotation (case of the disk) or in translation (case of the strip). In addition, an electronic unit may be associated with the photodetector(s) for processing the signals emitted by the photodetector(s).

Generally, the assembly of these components is disposed in a reduced volume, however, when these means are distant from each other, conductors provide the electric connections, between the power supply means, the optoelectronic system forming the reading assembly and the electronic signal processing unit.

In some applications, there exists a large distance between the reading assembly and the electronic signal processing unit. Any electric connection should be avoided between these two assemblies because such a connection would risk being disturbed by outside interferences, more particularly in the case of analog transmission of the signals between the reading assembly and the electronic signal processing unit.

SUMMARY OF THE INVENTION

The present invention aims at providing an optical device for locating by diascopy the position of a mobile unit distant from the electronic unit processing the signals which represent this position, while avoiding any outside interferences.

In accordance with the invention, a position locating device is provided formed of three parts, namely:

(a) a data sensor which cooperates with the position code carrying element comprising the optically coded tracks;

(b) an optoelectronic module with an electronic signal processing unit; and (c) optical bidirectional optical fiber transmission means;

and wherein (i) the module comprises: at least one optoelectronic light emitter; a bidirectional optical beam coupler; and an optoelectronic reader associated with the processing unit for processing the electric signals emitted by this optoelectronic reader in response to light signals; the power supply for the optoelectronic emitter and the optoelectronic reader of the moduler being provided by electric supply means; and the emitter, the bidirectional coupler and the reader being disposed with respect to one of the ends of the bidirectional optical transmission means so that the emitter may send light onto this end, through the coupler, and so that the receiver may receive the light from this end, through said coupler; and (ii) said sensor comprises, for cooperating with the position code carrying element comprising the optically coded tracks: a series of micromirrors modulating by reflection, namely a micromirror opposite each coded track and opposite the second end of said bidirectional optical transmission means able to pivot between a first position in which it lets through the light coming from the second end of the optical transmission means so that it reaches the associated coded track and returning from a reflecting zone of this coded track towards the second end, and a second position in which it reflects the light coming from this second end; means for urging the micromirrors into the second position; a control unit for bringing the micromirrors, successively and cyclically, one by one into the first position; and a self contained power supply source supplying the control unit.

Advantageously:

an optical system is disposed between the second end of the optical transmission means and the micromembers, in front of the optoelectronic reader of the module and/or between the optoelectronic emitter and the first end of the optical transmission means;

the self contained power supply source of the sensor is formed advantageously by an electric dry cell, a photovoltaic cell supplied with external light by an optical fiber or a local power supply source by microgeneration;

the bidirectional coupler is a semitransparent mirror.

The invention will in any case be well understood from the complement of description which follows with reference to the accompanying drawings, which description and drawings are given by way of example.

DESCRIPTION OF THE PREFERRED EMBODIMENTS

The invention is described hereafter in a preferred embodiment applying to the location of an angular position, the mobile element with axis X-X supporting, interlocked therewith for rotation, a coded disk 1 with several concentric coded tracks, each having a succession of very fine zones alternately opaque (reflecting) and transparent in the periperal direction.

Figure 1:
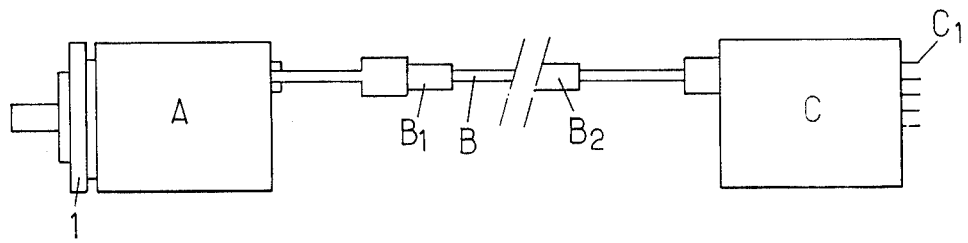
FIG. 1 illustrates schematically the whole of the optical position locating device incorporating the improvements of the invention, showing its three component units, namely the sensor, the optical transmission means and the module.
Figure 2:
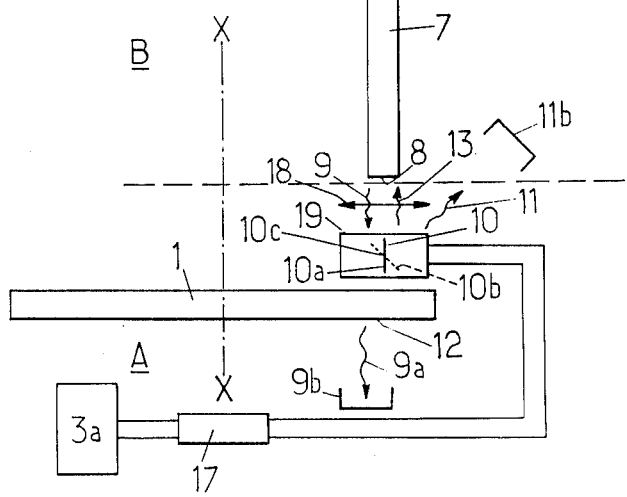
FIG. 2 shows the components of the three units illustrated in FIG. 1.
Figure 3:
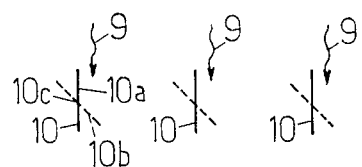
FIG. 3 illustrates the series of micromirrors of the device of FIGS. 1 and 2.

Referring more particularly to FIG. 2 in which the sensor A, the optical fiber light transmission system B formed for example by an optical cable with one or more fibers, and the optoelectronic module C (assemblies A, B and C) which are to be found in FIG. 1) have been separated by broken lines, it can be seen that the apparatus of the invention comprises essentially:

a first optoelectronic light emitter 2, formed for example by a light emitting diode and supplied with power by supply means 3, for example external means formed by the general electricity source available;

a bidirectional optical beam coupler formed for example by a semitransparent mirror 4;

an optical system 2a which causes the light 5 emitted by the optoelectronic emitter 2 and passing through the semitransparent mirror 4 to converge on the surface 6 forming the first end of the optical transmission system B (formed for example by means of at least one optical fiber 7);

an optical system 18 disposed opposite the surface 8 forming the second end of the optical fiber transmission means 7 for controlling the rays 9 coming from this or these optical fibers;

an optical system 20 disposed in front of the reader 15 for controlling the rays 14 transmitted to the reader;

a series 19 of micromirrors 10, as shown in FIG. 3, these micromirrors 10, namely one micromirror per coded track of the disk 1, being placed with the optical system 18 between the surface 8 of the optical fibers 7 and the coded tracks of disk 1 and each micromirror 10 being able to occupy a first position 10a shown with continuous lines perpendicular to the surface 12 of disk 1 and a second position 10b shown with broken lines at an angle to this surface 12 (see also FIG. 3), in which position 10b the rays 9 are reflected as rays 11;

means (not shown) for normally maintaining all the micromirrors 10 in the second position 10b;

a control unit 17 for successively and cyclically bringing the micromirrors 10 one by one into the first position 10a;

a self contained power supply source 3a formed advantageously by an electric dry cell, a photovoltaic cell supplied with external light by an optical fiber or a local power supply source by microgeneration, this souce feeding the control unit 17. In the case of a local microgeneration power supply source, this latter may be advantageously formed by a system comprising a solenoid which surounds a magnetic bar, means, in particular a manometric capsule, for controlling the relative solenoid/magnetic bar movement in the system, rectifier means whose input is connected to the terminals of the solenoid and electric energy storage means connected to the output of said rectifier means;

an optoelectronic reader 15 formed for example by a photodetector, this reader emitting an electric pulse in response to a light pulse 14 received from the end 6 of fiber 7 after reflection from the semitransparent mirror 4; and a unit 16 for processing the electric pulses produced by the reader 15.

The coder may also comprise:

an optical system (not shown) between the semitransparent mirror 4 and diode 15;

a light trap 9b directed towards the surface 12 of the coded disk 1 for absorbing the rays such as 9a not reflected by a micromirror 10 in position 10b and having passed through a transparent zone of disk 1 and/or a light trap 11b for absorbing the rays such as 11.

In so far as the micromirrors 10 and the control unit 17 therefor are more particularly concerned, they may be formed by aluminium reflecting microflaps oscillating about their axis 10c, springs normally urging them into a rest position 10b; on the other hand, the unit 17 controls the bringing of each of the micromirrors one after the other into the other active position 10a.

The microflaps 10 and the control unit 17 may be formed for example as described in the published French patent application Ser. No. 2,478,352 filed on the Mar. 10, 1981 by Centre Electronique Horloger S.A. to which the Bristish Pat. No. 2,071,896 corresponds, which allows them to be obtained in the form of an element which may be controlled by pulses coming from the control unit 17 with a reduced power consumption.

During operation one and only one micromirror 10 is in position 10a; for this micromirror the light 9 coming from fiber 7 reaches the coded track of disk 1 corresponding to this micromirror.

If a transparent zone is opposite this mirror the light leaves under disk A as ray 9a towards the trap 9b, if provided;

If a reflecting zone is opposite this mirror the light is reflected towards fiber 7 as ray 13 and, through fiber 7, strikes the semitransparent mirror 4 and is reflected as ray 14 which excites the reader 15 which sends an electric pulse to the processing unit 16.

The other micromirrors 10 are in position 10b and the light coming from fiber 7 is reflected by such a micromirror 10 as ray 11 which does not reach fiber 7 but is directed towards the trap 11b if provided.

The control unit 17 brings the micromirrors one after the other into the active position 10a and thus a parallel/series conversion is provided, the tracks being read one after the other and with emission of a group of light pulses 13 or absences of light pulses (in as many positions as there are coded tracks), a light pulse 13 corresponding to a reflecting zone and an absence of pulse to a transparent zone of the track corresponding to the position in question. The successive readings therefore result in successive groups of light pulses 13 and absences of pulses, such a pulse corresponding then to a reflecting zone.

The above mentioned light pulses 13 are transmitted by the optical fiber 7 and reflected by the semitransparent mirror 4 as light pulses 14 which are transformed into electric pulses by the reader 15, these latter being processed in unit 16.

In FIG. 1 there is shown the units of the sensor A with the coded disk 1, of the optical cable B forming the optical fiber transmission means and of the module C with its outputs $C_1$ towards the means using the output signals of modules C and the connectors B and $B_2$ of the optical cable B for connection respectively with the sensor A and module C.

Operation of the device of the invention comrpises a first period of bringing into service which lasts for about 0.5 to 1 second, in the case of photovoltaic current generation, but which may be of a different duration for another type of power source.

This period of bringing into service is followed by a first work cycle comprising activation of the optoelectronic emitter 2 and of the multiplexing optical reader by the series of micromirrors. This work period lasts for about 2 ms.

Then a rest or recharging time is provided for the power source which may be of the order of 20 ms, at the end of which time a new period may begin again.

The result is that the work-rest cycle may begin again for example about every 22 ms.

During each work cycle the control means 17 actuates successively each micromirror 10 for bringing if from its position 10b to its position 10a, which allows each of the tracks of disk 1 to be successively scanned, the reader 15 receiving a light pulse 14 and emitting an electric pulse whenever, for the micromirror in position 10a a reflecting zone of the corresponding track is opposite the micromirror. The groups of electric pulses emitted by reader 15 are processed in the processing unit 16, successively for each of the coded tracks selected by the control unit 17. Thus the opaque reflecting zones of each coded track are detected.

Figure 4:
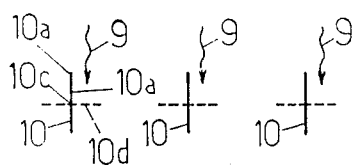
FIG. 4 illustrates a variant of FIG. 3.

In a variant illustrated in FIG. 4, the micromirrors 10 may have a rest position 10d parallel to the surface 12 of the coded disk 1 and may therefore reflect back to fiber 7, as rays 13, the light 9 received from this fiber when they are in the rest position 10d. In this case trap 11b is useless.

As before, a micromirror 10 in its active position 10a lets the rays 9 pass through to the associated coded track; if the zone of this track which receives rays 9 is transparent it lets these rays pass through as rays 9a; if this zone is opaque these rays 9 are reflected back towards the optical fibers 7 as rays 13.

It is then, in this variant, the transparent zones of each coded track of disk 1 which are detected because such zones are signalled by the absence of rays 13, so of light pulse 14 and consequently of electric pulse emitted by the reader 15.

An electric inverter may be provided between the output of reader 15 and the processing unit 16.

It can be seen that the optical fiber 7 and the associated optoelectronic systems serve for remote bidirectional transmission without risks of outside interferences between sensor A and module C.

As is evident, the invention is in no way limited to those modes of application and embodiments which have been more especially considered; it embraces, on the contrary, all variants thereof.

What is claimed is:

1. A position locating device comprising:
   (a) a data sensor which cooperates with a position code carrying element comprising optically coded tracks;
   (b) an optoelectronic module including an electronic signal processing unit; and
   (c) bidirectional optical fiber transmission means;
      (i) said optoelectronic module including:
      at least one optoelectronic light emitter;
      bidirectional optical beam coupler;
      an optoelectronic reader for transforming light signals into electric signals to be processed by said electronic signal processing unit;
      a power supply for said optoelectronic light emitter and said optoelectronic reader;
      said optoelectronic light emitter, said bidirectional optical beam coupler and said optoelectronic reader being disposed such that said optoelectronic light emitter emits light through said bidirectional optical beam coupler onto a first end of said bidirectional optical fiber transmission means and said optoelectronic reader receives light from said first end of said bidirectional optical fiber transmission means, through said bidirectional optical beam coupler;
      (ii) said data sensor including:
      a series of micromirrors for modulating light output by a second end of said bidirectional optical transmission means, each of said micromirrors being disposed opposite an associated one of said optically coded tracks of said position code carrying element, respectively, and opposite said second end of said bidirectional optical transmission means, each of said micromirrors being pivotable between a first position in which said micromirror allows said light output by said second end of said bidirectional optical transmission means to pass therethrough so that said light reaches said associated optically coded track and returns from a reflecting zone of said optically coded track to said second end of said bidirectional optical transmission means and a second position in which said micromirror reflects said light output by said second end of said bidirectional optical transmission means;
   means for urging said micromirrors into said second position;
   a control unit adapted for bringing said micromirrors successively and cyclically one by one into said first position; and
   a self contained power source for supplying power to said control unit.

2. The position locating device as claimed in claim 1, wherein an optical system is disposed between said optical transmission means and said micromirrors.

3. The position locating device as claimed in claim 1, wherein an optical system is disposed between said optoelectronic reader of said optoelectronic module.

4. The position locating device as claimed in claim 1, wherein an optical system is disposed between said optoelectronic light emitter and said bidirectional optical transmission means.

5. The position locating device as claimed in claim 1, wherein said self contained power source for said data sensor comprises an electric dry cell.

6. The position locating device as claimed in claim 1, wherein said self contained power source for said data sensor comprises a photovoltaic cell.

7. The position locating device as claimed in claim 1, wherein said self contained power source for said data sensor comprises a local microgeneration power supply source including a solenoid which surrounds a magnetic bar, means for controlling relative solenoid/magnetic bar movement, rectifier means whose input is connected to terminals of said solenoid, and electric energy storage means connected to an output of said rectifier means.

8. The position locating device as claimed in claim 1, wherein said micromirrors comprise reflecting microflaps and form a single component with said control unit.

9. The position locating device as claimed in claim 8, wherein said microflaps are controlled by pulses provided by said control unit.

10. The position locating device as claimed in claim 1, wherein said second position of each micromirror forms an acute angle with respect to said first position thereof so that in this second position each micromirror reflects said light output by said second end of said bidirectional optical transmission means in such a direction that it is not reflected to said second end of said bidirectional optical transmission means.

11. The position locating device as claimed in claim 1, wherein said second position of each micromirror is perpendicular to said first position thereof, so that in this second position each micromirror reflects said light output by said second end of said bidirectional optical transmission means back to said second end of said bidirectional optical transmission means.

* * * * *